United States Patent
Gayme

(10) Patent No.: US 6,546,354 B1
(45) Date of Patent: Apr. 8, 2003

(54) RESONANCE IDENTIFICATION EXTENSION FOR A SELF-BALANCING ROTATABLE APPARATUS

(75) Inventor: Dennice F. Gayme, St. Paul, MN (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 10/001,098

(22) Filed: Nov. 15, 2001

(51) Int. Cl.⁷ .............................................. G01P 3/00
(52) U.S. Cl. ........................ 702/147; 68/23; 68/23.1; 68/23.2; 68/12.06; 8/159
(58) Field of Search .................... 702/147; 210/144, 210/363; 68/23, 23.1, 23.2, 12.06; 8/159; 74/573; 73/458; 318/611

(56) References Cited

U.S. PATENT DOCUMENTS

| | | | |
|---|---|---|---|
| 3,799,348 A | 3/1974 | Mazza | 210/144 |
| 3,983,035 A | 9/1976 | Arkeveld et al. | 210/138 |
| 4,000,658 A | 1/1977 | Schmidt | 73/490 |
| 4,157,781 A | 6/1979 | Maruyama | 233/23 A |
| 4,322,641 A | 3/1982 | Packard | 307/521 |
| 4,694,156 A | 9/1987 | Swanberg | 250/214 |
| 4,991,247 A | 2/1991 | Castwall et al. | 8/158 |
| 5,150,314 A | 9/1992 | Garratt et al. | 364/571.02 |
| 5,280,660 A | 1/1994 | Pellerin et al. | 8/158 |
| 5,325,677 A | 7/1994 | Payne et al. | 68/12.04 |
| 5,376,063 A | 12/1994 | Greenstein | 494/37 |
| 5,490,436 A | 2/1996 | Coyne et al. | 74/573 |
| 5,561,993 A | 10/1996 | Elgersma et al. | 68/23.2 |
| 5,582,040 A | 12/1996 | Khan | 68/23.2 |
| 5,692,313 A | 12/1997 | Ikeda et al. | 34/58 |
| 5,715,731 A | 2/1998 | Koch | 74/573 |
| 5,720,066 A * | 2/1998 | Kim | 8/159 |
| 5,729,025 A | 3/1998 | Erickson et al. | 250/574 |
| 5,731,868 A | 3/1998 | Okey et al. | 356/73 |
| 5,757,481 A | 5/1998 | O'Brien et al. | 356/243 |

(List continued on next page.)

FOREIGN PATENT DOCUMENTS

EP 1 036 875 A2 9/2000 ............ D06F/39/08

Primary Examiner—John Barlow
Assistant Examiner—Anthony Dougherty
(74) Attorney, Agent, or Firm—Kris T. Fredrick; Kermit D. Lopez; Luis M. Ortiz

(57) ABSTRACT

A method for identifying resonance in a rotating system, wherein the rotating system includes sensors and sensor measurements thereof whose responses to control actions is utilized to represent the rotating system through a control model is disclosed. The control model determines actions required to balance the system (i.e., to drive sensor measurements to zero). The current state of the system is evaluated and recorded by obtaining current sensor readings from at least one sensor associated with the rotating device. The system model can then be used with at least one current sensor reading to calculate at least one predicted sensor reading due to changes in rotational speed of the rotating system. After changing the speed of the rotating system new sensor readings can be obtained and recorded. The new sensor readings can then be compared to the predicted sensor readings to determine if the rotating system is entering resonance, based on a difference between the current sensor readings and the predicted sensor readings. The resonance of the rotating system may thus be dynamically identified.

24 Claims, 7 Drawing Sheets

U.S. PATENT DOCUMENTS

| | | | |
|---|---|---|---|
| 5,761,932 A | 6/1998 | Kim | 68/23.2 |
| 5,761,933 A | 6/1998 | Kim et al. | 68/23.2 |
| 5,765,402 A | 6/1998 | Ikeda et al. | 68/12.06 |
| 5,800,628 A | 9/1998 | Erickson et al. | 134/18 |
| 5,850,748 A | 12/1998 | Kim et al. | 68/23.2 |
| 5,862,553 A | 1/1999 | Harberl et al. | 8/159 |
| 5,870,907 A | 2/1999 | Cho | 68/23.1 |
| 5,893,280 A | 4/1999 | Honda et al. | 68/12.06 |
| 5,913,951 A | 6/1999 | Herr et al. | 8/158 |
| 5,921,148 A | 7/1999 | Howell | 74/573 |
| 5,923,433 A | 7/1999 | Giuffre et al. | 356/440 |
| 5,930,855 A * | 8/1999 | Vande Haar et al. | 8/159 |
| 5,957,144 A | 9/1999 | Neff et al. | 134/56 D |
| 5,960,804 A | 10/1999 | Cooper et al. | 134/56 D |
| 5,979,236 A | 11/1999 | Hong et al. | 73/458 |
| 6,007,640 A | 12/1999 | Neff et al. | 134/18 |
| 6,029,300 A | 2/2000 | Kawaguchi et al. | 8/159 |
| 6,047,428 A | 4/2000 | Min | 8/159 |
| 6,077,423 A | 7/2000 | Roy et al. | 210/121 |
| 6,082,151 A | 7/2000 | Wierzba et al. | 68/23.2 |
| 6,129,768 A | 10/2000 | Johnson et al. | 8/159 |
| 6,134,926 A * | 10/2000 | Vande Haar et al. | 68/12.06 |
| 6,144,447 A | 11/2000 | Ohman et al. | 356/246 |
| 6,148,647 A | 11/2000 | Kabeya et al. | 68/140 |
| 6,159,384 A | 12/2000 | Roberts et al. | 210/741 |
| 6,282,965 B1 * | 9/2001 | French et al. | 73/660 |
| 6,130,928 A1 | 10/2002 | Jamzadeh et al. | 377/23 |

* cited by examiner

RESONANCE IDENTIFICATION EXTENSION FOR A SELF-BALANCING ROTATABLE APPARATUS

RELATED APPLICATIONS

This application is related to co-pending and co-owned patent applications entitled: "Method and Apparatus for Reducing Microprocessor Speed Requirements in Data Acquisition Applications," Honeywell Docket No. M10-01121, U.S. Ser. No. 09/792,996, filed on Feb. 26, 2001; "Method and System for Detecting Fluid Injection from Stationary to Rotating Members," Honeywell Docket No. M10-01128, U.S. Ser. No. 09/951,790, filed on Sep. 10, 2001; "Simultaneous Injection Method and System for a Self-Balancing Rotatable Apparatus," Honeywell Docket No. H16-26312, U.S. Ser. No. 09/896,763, filed on Jun. 29, 2001; "Energy-Based Thresholds Applied to Dynamic Balancing," Honeywell Docket No. H16-02079, U.S. Ser. No. 09/951,798, filed on Sep. 10, 2001; "Dynamic Correlation Extension for a Self-Balancing Rotatable Apparatus" Honeywell Docket No. H16-26311, U.S. Ser. No. 09/951,932, filed on Sep. 10, 2001; "Continuous Flow Method and System for Placement of Balancing Fluid on a Rotating Device Requiring Dynamic Balancing", Honeywell Docket No. H16-01112, U.S. Ser. No. 10/001,006, filed on Nov. 15, 2001; "Dynamic Balancing Application Mass Placement", Honeywell Docket No. H16-01117, U.S. Ser. No. 10/001,090, filed on Nov. 15, 2001; "Fixed-Bandwidth Correlation Window Method and System for a Self-Balancing Rotatable Apparatus," Honeywell Docket No. M10-02075, U.S. Ser. No. 09/999,594, filed on Nov. 15, 2001; "Supervisory Method and System for Improved Control Model Updates Applied to Dynamic Balancing," Honeywell Docket No. H16-02076, U.S. Ser. No. 10/011,218, filed on Nov. 15, 2001; "Data Manipulation Method and System for a Self-Balancing Rotatable Apparatus," Honeywell Docket No. H16-02078, U.S. Ser. No. 10/000,882, filed on Nov. 15, 2001; "Method and System for Mechanizing Simultaneous Multi-Actuator Actions Applied to Dynamic Balancing," Honeywell Docket No. H16-26313, U.S. Ser. No. 10/000,255, filed on Nov. 15, 2001.

TECHNICAL FIELD

The present invention relates generally to rotatable members that are able to achieve balanced conditions throughout a range of rotational speeds. The present invention also relates to methods and systems for dynamically balancing rotatable members through the continual determination of out-of-balance forces and motion to thereby take corresponding counter balancing action. The present invention additionally relates to methods and systems for dynamically identifying resonance in rotating systems.

BACKGROUND OF THE INVENTION

Mass unbalance in rotating machinery leads to machine vibrations that are synchronous with the rotational speed. These vibrations can lead to excessive wear and to unacceptable levels of noise. Typical imbalances in large, rotating machines are on the order of one inch-pound.

It is a common practice to balance a rotatable body by adjusting a distribution of moveable inertial masses attached to the body. This state of balance may remain until there is a disturbance to the system. A tire, for instance, can be balanced once by applying weights to it. This balanced condition will remain until the tire hits a very big bump or the weights are removed. However, certain types of bodies that have been balanced in this fashion will generally remain in balance only for a limited range of rotational velocities. A centrifuge for fluid extraction, however, can change the amount of balance as more fluid is extracted.

Many machines are also configured as freestanding spring mass systems in which different components thereof pass through resonance ranges during which the machine may become out-of-balance. Additionally, such machines may include a rotating body loosely coupled to the end of a flexible shaft rather than fixed to the shaft as in the case of a tire. Thus, moments about a bearing shaft may also be created merely by the weight of the shaft. A flexible shaft rotating at speeds above half of its first critical speed can generally assume significant deformations, which add to the imbalance. This often poses problems in the operation of large turbines and turbo generators.

Machines of this kind usually operate above their first critical speed. As a consequence, machines that are initially balanced at relatively low speeds may tend to vibrate excessively as they approach full operating speed. Additionally, if one balances to an acceptable level rather than to a perfect condition (which is difficult to measure), the small remaining out-of-balance will progressively apply increased force as the speed increases. This increase in force is generally due to the fact that F is proportional to $r\omega^2$, (where F represents the out-of-balance force, r represents the radius of the rotating body and $\omega$ represents its rotational speed).

The mass unbalance distributed along the length of a rotating body gives rise to a rotating force vector at each of the bearings that support the body. In general, the force vectors at respective bearings are not in phase. At each bearing, the rotating force vector is generally opposed by a rotating reaction force, which may be transmitted to the bearing supports as noise and vibration. The purpose of active, dynamic balancing is generally to shift an inertial mass to the appropriate radial eccentricity and angular position for canceling the net unbalance. At the appropriate radial and angular distribution, the inertial mass will generate a rotating centrifugal force vector equal in magnitude and phase to the reaction force referred to above. Although rotatable objects find use in many different applications, one particular application is a rotating drum of a washing machine.

Many different types of balancing schemes are known to those skilled in the art. U.S. Pat. No. 5,561,993, which was issued to Elgersma et al. on Oct. 22, 1996, discloses a self-balancing rotatable apparatus. U.S. Pat. No. 5,561,993 is incorporated by reference. Elgersma et al. disclosed a method and system for measuring forces and motion via accelerations at various locations in a system. The forces and moments were balanced through the use of a matrix manipulation technique for determining appropriate counterbalance forces located at two axial positions of the rotatable member. The method and system described in Elgersma et al. accounted for possible accelerations of a machine, such as a washing machine, which could not otherwise be accomplished if the motion of the machine were not measured. Such a method and system was operable in association with machines that are not rigidly attached to immovable objects, such as concrete floors. Thus, the algorithm disclosed by Elgersma et al. permitted counterbalance forces to be calculated even though a washing machine can be located on a flexible or mobile floor structure combined with carpet and padding between the rotating machinery and a rigid support structure.

Convergence problems have been noted, however, in prototype implementations of U.S. Pat. No. 5,561,993. Such convergence problems are associated with resonant frequencies of prototype implementations. In particular regions of operation surrounding the resonant frequencies, the response of the system to inputs (i.e. test or control actions) can be greatly amplified. This creates problems because in the control system being used the creation of each control model relies on performing test actions. These test actions are performed at each speed and the size of the action can be predetermined based on applying a known force at each incremental speed of operation. As the machine enters the region surrounding the resonance, these test actions may push the machine very far from balanced conditions due to the amplifying effect. If the test actions drive the machine too far up a resonant peak, or too far away from balanced conditions, an associated control algorithm may not converge quickly or may be unable to drive the motion of the prototype below acceptable limits.

As described herein, the size of the test action may be based on the amount of force that is generally required to permit the sensor measurements associated with the rotating machine to change (respond) by a meaningful amount. In regions surrounding the resonance, a smaller test action may produce this meaningful response and may also serve to hold the system closer to its balanced state.

In some systems one could merely characterize the frequency response of the system and then use the characterization to identify the speeds that correspond to resonance and the surrounding regions. Based on these tests one could then adjust the test action magnitudes accordingly in these regions. However, in some situations such as those described in the preferred embodiment of U.S. Pat. No. 5,561,993, the system in question may be dynamic. For example, in a washing machine application the location and characteristics of the out-of-balance changes with each load of clothes. In the preferred embodiment of the present invention, the frequency response of the machine can be highly related to the mass of the spinner out-of-balance (i.e., eccentric mass), and, as a result, the RPM associated with the resonance also changes with each new wash load or machine run.

Based on the foregoing, it can be appreciated that previous methods for dynamically balancing a rotatable member have experienced severe limitations in the degree of balance that can be achieved and in the rotational speeds under which they are workable. In order to overcome some of the limitations of these inventions it may be desirable to dynamically identify the resonance associated with self-balancing rotatable devices, such as the system disclosed in U.S. Pat. No. 5,561,993. The ability to dynamically identify resonance can permit the size of test actions to be adjusted to mitigate the amplification of a machine or system's response to test actions. The incremental changes in speed in regions surrounding the resonance frequencies of rotating machinery can also be adjusted to compensate for the amplified sensor responses that result from the increase in force associated with an increase in rotational speed.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide methods and systems in which rotatable members can achieve balanced conditions throughout a range of rotational speeds.

It is another aspect of the present invention to identify resonance in a rotating system and use this information to adjust control actions and speed change increments to facilitate the achievement of balanced conditions throughout a range of rotational speeds.

It is yet another aspect of the present invention to determine if a rotating system is entering resonance by comparing predicted sensor readings to current sensor readings.

The above and other aspects can be achieved as is now described. A method and system for identifying resonance in a rotating system having at least one sensor therein are disclosed. As the speed of the system is changed, a change in sensor readings may occur due to the changed speed of the rotating system. If a reading from at least one sensor within the rotating system is obtained prior to a speed change, one can calculate predicted sensor readings for a new speed for at least one sensor within the rotating system. The predicted readings may be calculated based on a control model of the rotating system and the desired change in the speed of the rotating system. These predicted sensor readings serve as a prediction of the system response to a speed change based on a system that is not operating within its natural frequency band. Then, after the actual change in speed has been carried out, new sensor readings may be obtained from at least one sensor. These actual sensor readings can then be compared to the predicted sensor readings to determine if the rotating system is entering resonance, based on a difference between the current sensor readings and the predicted sensor readings.

Once a region of resonance has been identified, at least one test action may be adjusted to mitigate the amplification of sensor measurement responses of the rotating system. The change between new speeds may also be altered in response to identification of a resonant condition. The control model may then be constructed using the modified test actions and then used to determine the control actions that are required to drive the sensor measurement response of the rotating system to a balanced condition. The rotating system may be balanced by applying control actions to the system determined utilizing the control model.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

The present invention involves the formulation of a general method for dynamically identifying resonance in a rotating system, such as the rotating system described in U.S. Pat. No. 5,561,993. The invention is generally an improvement of the invention disclosed in U.S. Pat. No. 5,561,993. The basic configuration and concepts explained in U.S. Pat. No. 5,561,993 are discussed herein, but do not limit the scope of the present invention, including preferred embodiments discussed herein. Features taught in U.S. Pat. No. 5,561,993 are discussed herein for illustrative purposes only, in order to explain the foundation from which the present invention was derived. Those skilled in the art can appreciate that such features, including figures, text, descriptions, equations and tables thereof do not limit the scope of the present invention.

Figure 1:
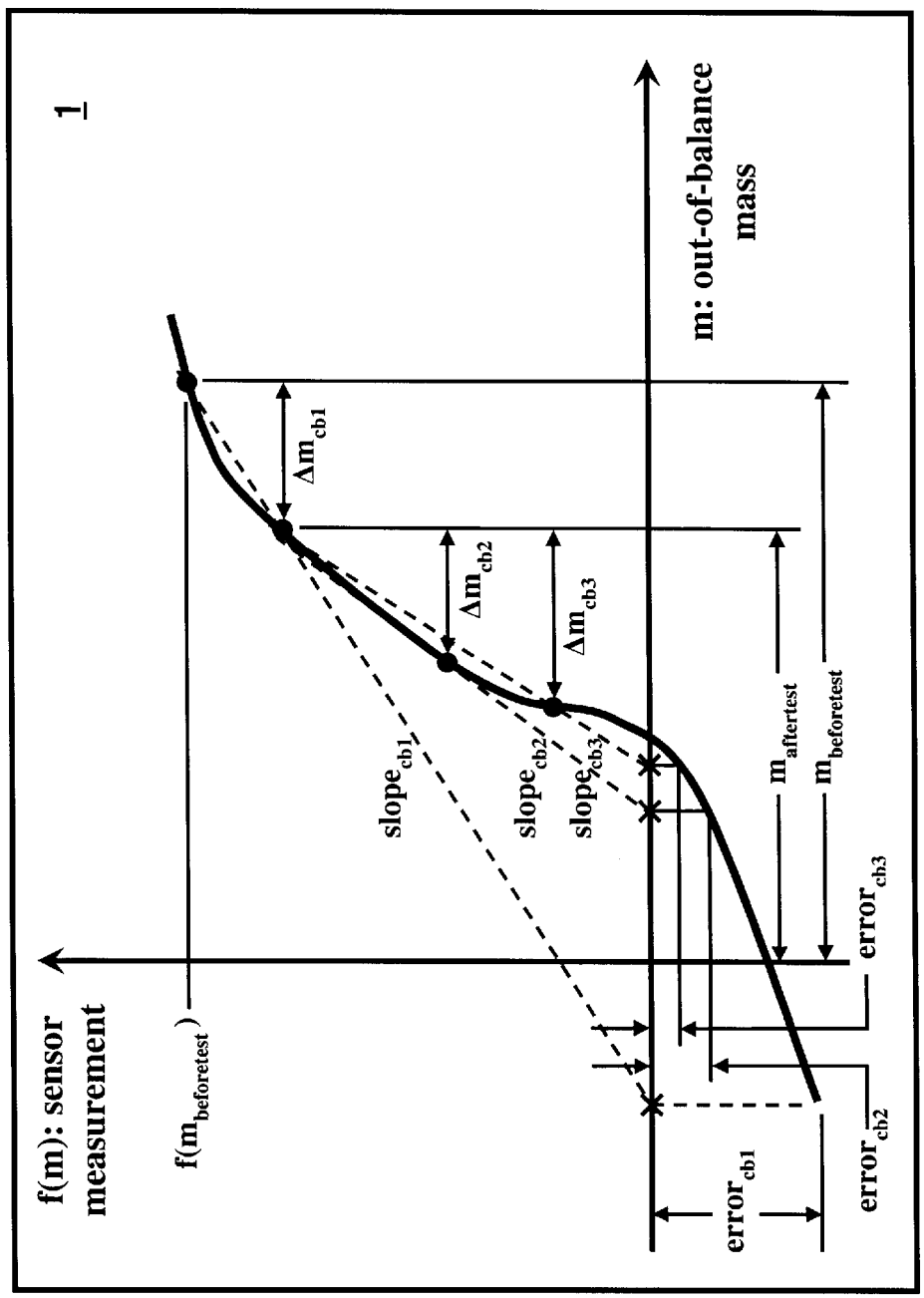
FIG. 1 depicts a plot of a non-linear system, in accordance with preferred embodiments of the present invention.

FIG. 1 depicts a plot of a non-linear system 1, in accordance with preferred embodiments of the present invention. Given a very simple (e.g., one-dimensional) non-linear system, such as the non-linear system in FIG. 1, the system can be balanced when the sensor measurement, f(m), is driven to zero. The objective of such a system is to find a value for a counterbalance Δm, such that the sensor measurement f(m) is driven to zero, i.e., f(m)=0. Utilizing a Taylor's series expansion in the vicinity of the anticipated operating range, and neglecting second order and higher terms, results in a linear model of the form y=b+mx. The linear model can be written to reflect the example illustrated in FIG. 1, where several possible line estimates are shown; equation 1 expresses this relationship.

$$f(m_{next}) \approx f(m_{aftertest}) + \left(\frac{\partial f(m)}{\partial m}\right) \cdot (m_{next} - m_{aftertest}) \quad (1)$$

Those skilled in the art can appreciate that f($m_{next}$) represents the desired sensor measurement. In addition, f($m_{aftertest}$) can represent the sensor measurement after a test action or a prior balance-control action. The variable m generally represents the out-of-balance in the system. For example, the variable $m_{aftertest}$ generally represents the out-of-balance after a test action (Δ$m_{test}$), and the change in m (i.e. Δm=$m_{next}$−$m_{aftertest}$) is the counterbalance required to achieve a desired sensor measurement, (f($m_{next}$) =0). The control action involves moving in the direction of the estimated counterbalance and updating the system model and the required counterbalance estimate as control progresses. Those skilled in the art can appreciate that this control implementation of equation 1 represents the well-known Newton Raphson iteration method.

Since the objective is to find f($m_{next}$)=0, the general form of equation 1 reduces to:

$$m_{next} = m_{aftertest} - \left[\frac{\partial f(m)}{\partial m}\right]^{-1} \cdot f(m_{aftertest}) \quad (2)$$

where $m_{next}$ is the solution or system out-of-balance needed to make f($m_{next}$)=0 or to drive the sensor measurement to zero. Thus, the estimated mass change Δ$m_{cb}$, generally required for counterbalance action is illustrated in equation 3.

$$\Delta m_{cb} = m_{next} - m_{aftertest} = -f(m_{aftertest}) / \left(\frac{\partial f}{\partial m}(m_{aftertest})\right) \quad (3)$$

The partial derivative, or slope of the sensor function, can be found by perturbing the system. This may be generally illustrated in equation 4, which represents the change in sensor measurements due to a test action (Δ$m_{test}$=$m_{aftertest}$−$m_{beforetest}$).

$$\frac{\partial f}{\partial m}(m_{aftertest}) = \frac{f(m_{aftertest}) - f(m_{beforetest})}{m_{aftertest} - m_{beforetest}} \quad (4)$$

Combining equations 3 and 4 may result in the generalized form shown in equation 5. This equation is generally expressed in an expanded notion of multiple inputs and outputs.

$$[f(m_{aftertest})] = -\left[\frac{\partial f(m)}{\partial m}\right] \cdot [\Delta m_{solution}] \quad (5)$$

Regarding the linear models and associated slope calculation in FIG. 1, it can be appreciated that a change in the mass may result in a change in the system, and the system itself may be nonlinear; thus, the linear model used to determine the next counterbalance may have significant error. Therefore, when applying the Newton Raphson iteration to a process, certain requirements should be followed. First, the initial approximation should be sufficiently accurate to result in subsequent operation near the desired solution. Also the measurement f(m) should be smooth, nearly linear and single-valued in the vicinity of the anticipated operation. Additionally, because higher derivatives are neglected in this type of approximation, the higher derivatives should be small, so as to avoid convergence problems.

Lastly, in applications of the Newton Raphson iteration, only one solution, (counterbalance mass Δ$m_{cb}$), should exist for the sensor measurement's being equal to zero. This means there is only one root. Even after following the above requirements, system noise may be a concern. In the hypothetical illustration of FIG. 2, a larger initial test action, which changes the system to point C, is preferable to the one that changes it to point B. This result can be illustrated by comparing the slopes of lines 22, 24 and 26, that result from the various test actions (perturbations) depicted in FIG. 2. The difference between the "before" and "after" test sensor measurements should be large enough to obtain a good approximation of the slope of the function, while ensuring that the resulting change in the measurement dominates any resulting changes due to system noise.

Figure 3:
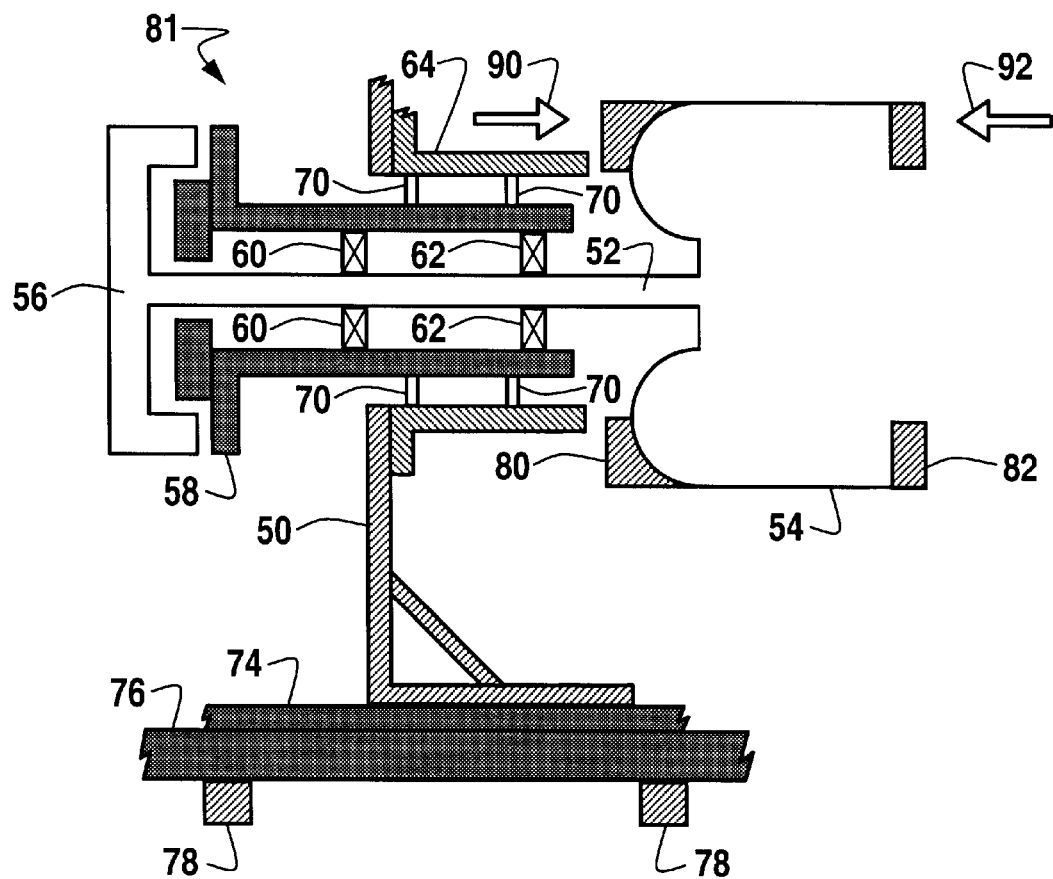
FIG. 3 depicts a schematic representation of a washing machine, which may be adapted for use in association with the present invention.

FIG. 3 depicts a schematic representation of a washing machine, which may be adapted for use in association with the present invention. Those skilled in the art can appreciate that the present invention may be implemented within a rotating device or rotating system, such as, for example, a washing machine. Those skilled in the art can further appreciate, however, that other types of rotatable systems or rotating devices may be utilized in accordance with the present invention. Note that as utilized herein, the terms "rotating system," "rotating device," "rotating apparatus," "rotatable apparatus," "rotatable system," or "rotatable device" may be utilized interchangeably. The methods and systems of the present invention may be implemented to balance rotating systems, rotating devices or rotating members thereof.

In the example of FIG. 3 the basic mechanism of dynamic balancing involves counter balancing the out-of-balance load by injecting water into a plurality of cups placed at front and back axial planes, identified by reference numbers 80 and 82 in FIG. 3, of the rotatable drum. Although the terms test mass or fluid injection may be used to describe the preferred embodiment, those skilled in the art can appreciate that such a test or control action may be comprised of many different materials, and the invention is not limited to fluid-based injection methodologies for placing mass.

FIG. 3 thus schematically illustrates a washing machine 81 comprising a frame 50, a shaft 52 and a rotatable drum 54. Shaft 52 may be attached to rotatable drum 54. These two components can be attached to a rotor or pulley 56 of a motor drive. Frame 50 can provide support for a bearing housing 58 in which bearings 60 and 62 are generally supported. A housing mount 64 can support bearing housing 58. A plurality of sensors identified by the reference numeral 70 is illustrated at location between the housing mount and the bearing housing in FIG. 3. These sensors will be described in greater detail below. Beneath frame 50 are generally shown a carpet and pad 74, a plywood support member 76 and a plurality of joists 78. The representation shown in FIG. 3 illustrates a typical application of a horizontal washing machine in a residential housing environment. Those skilled in the art can appreciate that FIG. 3 is presented for illustrative purposes only and that a variety of washing machine configurations and other rotating devices not illustrated herein may be utilized to implement varying embodiments of the present invention.

With continued reference to FIG. 3, the rotatable drum 54 may be shown having a plurality of schematically illustrated back cups 80 and front cups 82. Both the front and back cups may be disposed at axial ends of the rotatable drum 54 and, although not shown in FIG. 3, both the front and back cups can comprise a plurality of cups dispersed around the periphery of the drum. A quantity of water can be injected into the cups from a stationary control valve supplied with water, such as those identified by reference numerals 90 and 92.

Figure 4:
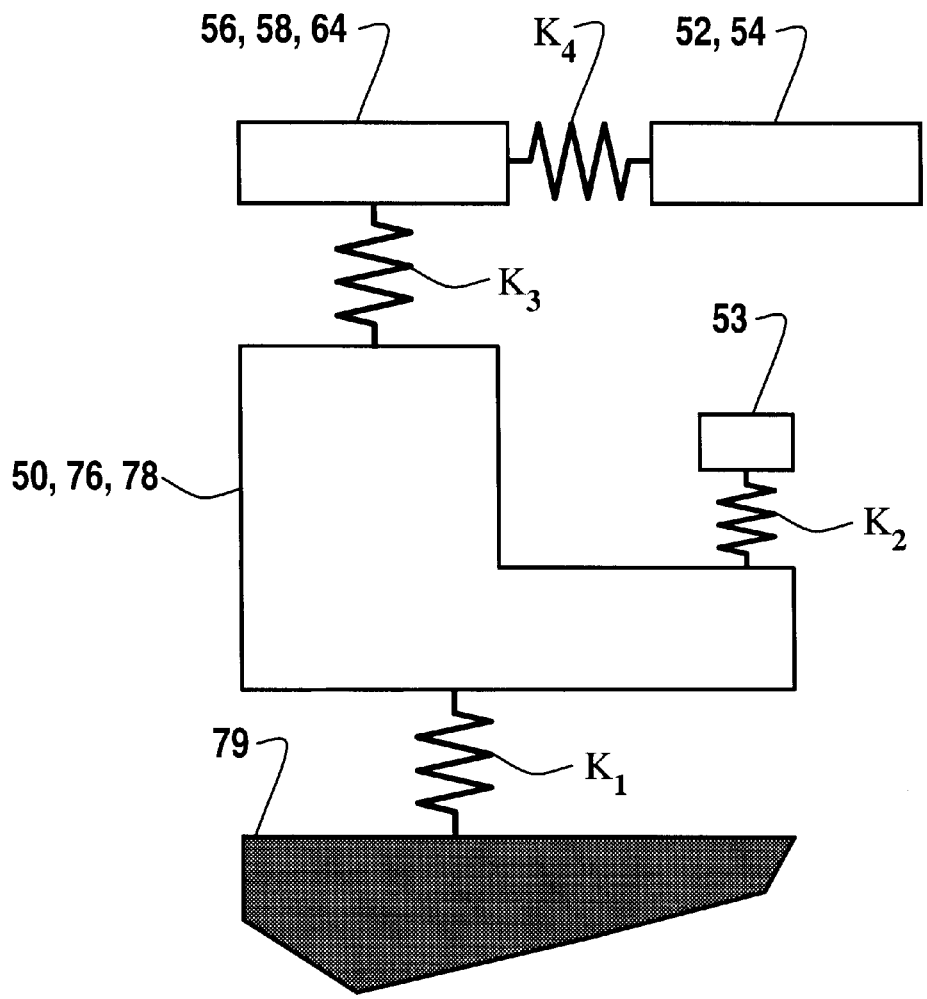
FIG. 4 is a spring and mass illustration depicting the manner in which a nonrigid washing machine can behave if mounted on nonrigid structures.

Many balancing systems assume that the machine may be attached rigidly to an immovable object or footing, such as a concrete floor. However, in most practical residential housing applications the machine is not rigidly attached to an immovable object and, instead, may be associated with a plurality of flexible members. For example, FIG. 4, depicts a schematic representation of a type of arrangement usually encountered in washing machine applications. FIG. 4 thus illustrates a spring and mass system depicting the manner in which a nonrigid washing machine can behave if mounted on nonrigid structures.

The behavior of frame 50 in relation to footing 79 can be described as a spring connecting frame 50 and floor 76 to footing 79 and having a spring constant K1. The relationship between a tub 53 (not shown in FIG. 3) surrounding the rotatable drum 54 and frame 50 can be described by a spring constant K2. A spring constant K3 represents the relationship among bearing housing 58 and housing mount 64 and frame 50 in FIG. 3. Lastly, FIG. 4 illustrates a spring constant K4 that represents the bending of shaft 52 along with rotatable members 54 and 56.

Although only represented by boxes in FIG. 4, the schematic illustration depicts a multitude of mass-spring subsystems that define the relationships among major components of the overall system. FIG. 4 demonstrates that the relationships among these components are not rigid and, as a result, can permit motion, resulting in accelerations, to occur in response to forces exerted on the various components. Therefore, since the system may not be rigid, measuring only the forces at sensors 70 shown in FIG. 3 would make accurate counterbalance determinations extremely difficult, if not impossible.

Figure 2:
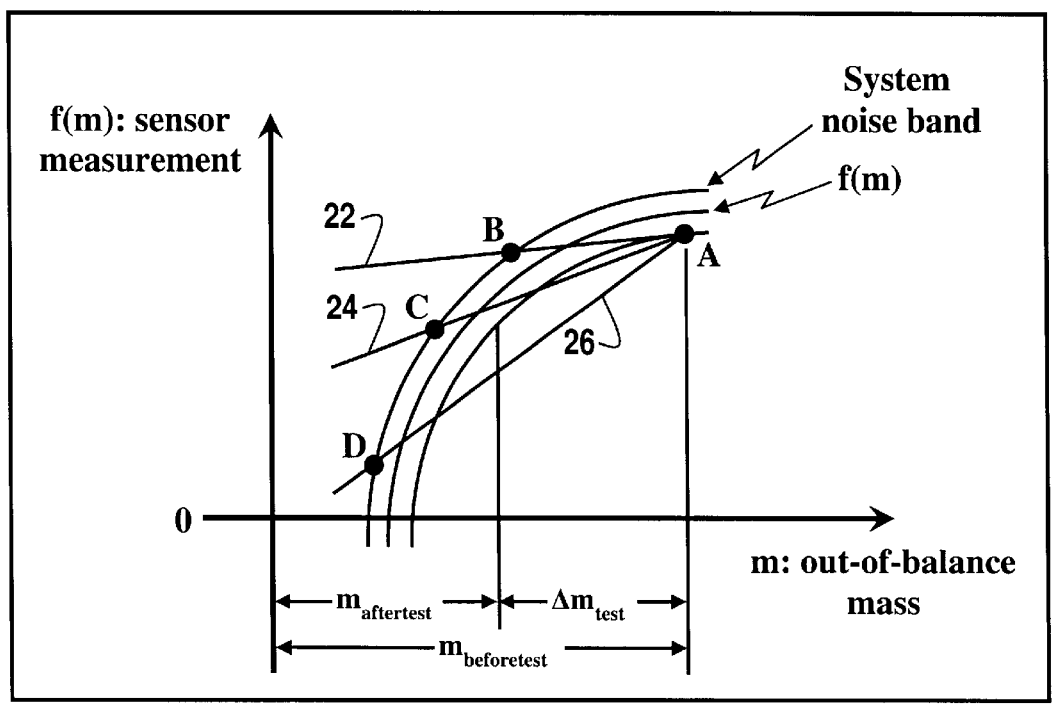
FIG. 2 is a graphical representation of a nonlinear system and the effect of system noise with which the present invention must be concerned.
Figure 5:
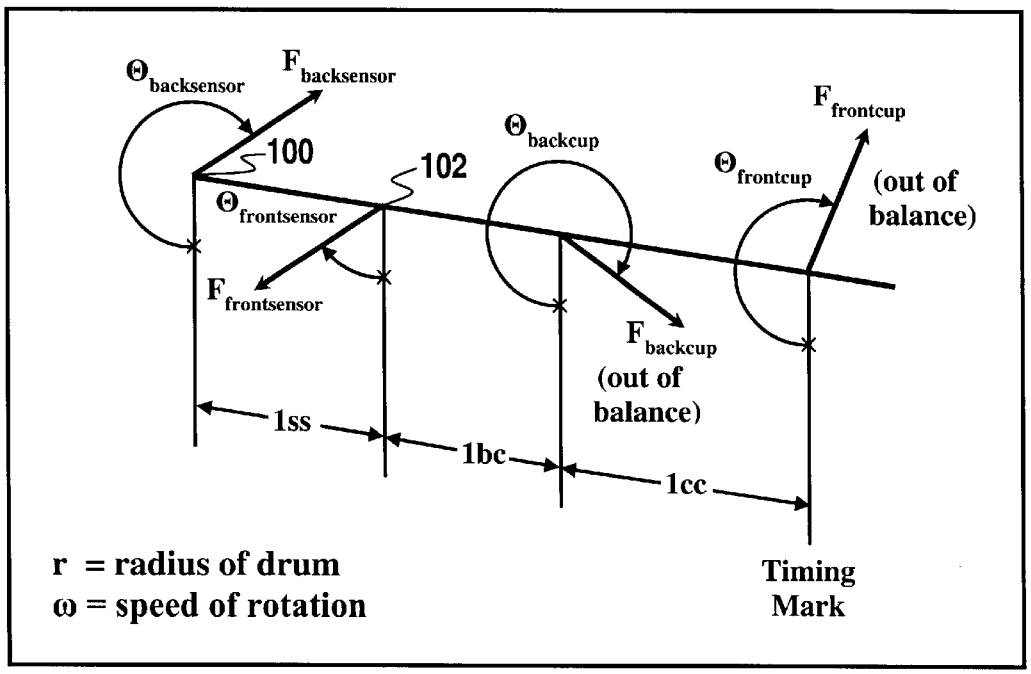
FIG. 5 depicts a three-dimensional schematic representation of the forces and critical lengths along an axis of rotation, which has been extended along a length of the shaft and through a length of the drum.

FIG. 5 illustrates a three dimensional schematic representation of the forces and critical lengths along the axis of rotation, which has been extended along the length of the shaft and through the length of the drum. Force sensors may be mounted to measure the force transmitted between housing mount 64 and bearing housing 58, as illustrated in FIG. 2. The basic concept of dynamic balancing stipulates that vector forces at the front and back cups may represent an out-of-balance condition. Referring to FIG. 5, the system may be provided with a mechanism for sensing a first force $F_{backsensor}$ at a first location 100 of the axis of rotation and a second mechanism for measuring a second force $F_{frontsensor}$ at a second location 102 of the axis of rotation. It should be understood that both the first and second forces shown in FIG. 5 are likely to be determined from a plurality of force sensors arranged so that the resultant force vectors along multiple axes of the system can be determined at each of the first and second locations, 100 and 102, of the axis of rotation.

If a washing machine or similar apparatus with a rotating member is rigidly attached to an unmovable object, such as a concrete floor, in such a way that movement of the machine is prevented, a mere force and moment analysis based on forces and moment arms shown in FIG. 5 would be appropriate and thus yield sufficient information to allow counterbalance forces to be implemented in a manner that would achieve a balance of a rotating drum 54. As discussed above in association with FIGS. 3 and 4, however, it is not practical to expect a machine of this type to be installed and operate without motion being experienced by the various portions of the machine. Therefore, it may be beneficial to measure motion relative to a footing or inertial space (e.g., acceleration) and account for it in the analysis of forces.

Figure 6:
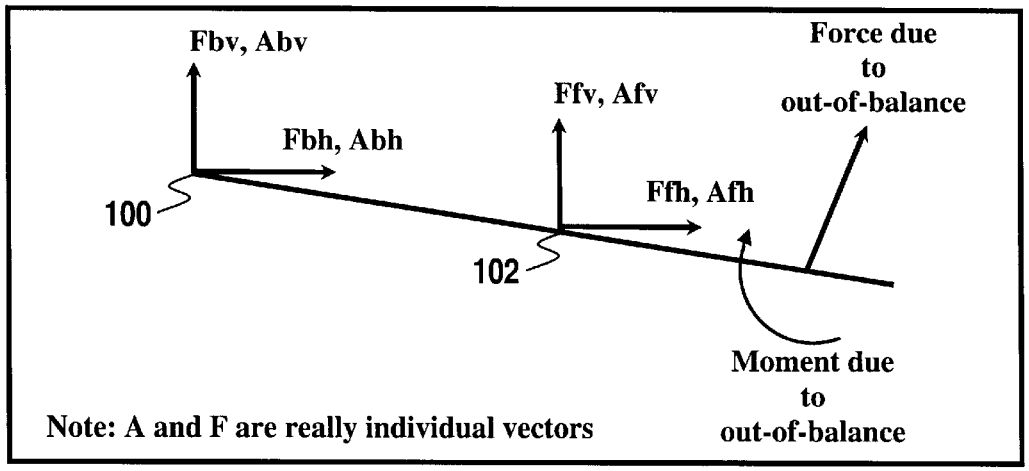
FIGS. 6 and 7 depict a graphical representation of a shaft with measured forces and accelerations.
Figure 7:
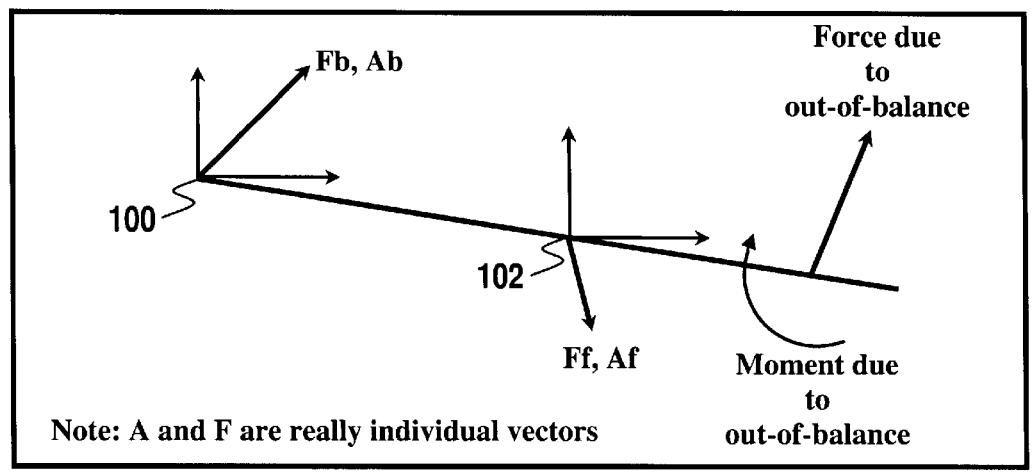

FIGS. 6 and 7 show the measurement of forces and accelerations in three-dimensional space at various locations along the shaft 52. Viewing FIGS. 6 and 7 together, it can be seen that the forces and accelerations can be measured at two coincident locations on the shaft 52. It can be appreciated, however, that this coincidence of the first force and the first acceleration or the second force and the second acceleration are not requirements of the present invention. At each of the first and second locations, 100 and 102, the effects of rotating out-of-balance forces are determined along the horizontal (h) and vertical (v) coordinates. It can be appreciated by those skilled in the art that the coordinates illustrated in FIGS. 6 and 7 represent the fact that the concepts in U.S. Pat. No. 5,561,993 and the present invention, operate with information describing the forces in terms of a magnitude, a fixed direction and an associated rotating drum angle. Similarly, the motion (e.g., accelerations) may also be expressed as a magnitude along a fixed direction with an associated rotating drum angle.

TABLE I

| VARIABLE | MEANING |
| --- | --- |
| Inputs | |
| $\Delta m_{front\_cb}$ | test counterbalance mass placed in the front plane (vector) |
| $\Delta m_{back\_cb}$ | test counterbalance mass placed in the back plane (vector) |
| $\omega_{back}$ | speed of rotation in (rad/sec) at which the back plane test counterbalance occurred |
| $\omega_{front}$ | speed of rotation in (rad/sec) at which the front plane test counterbalance occurred |
| r | radius of counterbalance placement (inches) |
| $\omega$ | current speed of rotation |
| Outputs | |
| $f_{back}$ | back force sensor (lbf) (vector) |
| $f_{front}$ | front force sensor (lbf) (vector) |
| $a_{back}$ | back accelerometer sensor (in/sec$^2$) (vector) |
| $a_{front}$ | front accelerometer sensor (in/sec$^2$) (vector) |
| Actions | |
| $m_{backplane\_cb}$ | estimated backplane counterbalance to drive sensor readings to zero (vector) |
| $m_{frontplane\_cb}$ | estimated frontplane counterbalance to drive sensor readings to zero (vector) |

For the following discussion, Table I illustrates the inputs and outputs utilized in the multi-input/multi-output condition relating to the invention described in U.S. Pat. No. 5,561,993. In order to find the appropriate solutions for the counterbalance forces described above, measured forces and accelerations should be considered in the balancing of system forces and moments. As described above, the counterbalance masses, forces and accelerations represent magnitudes and angles. Therefore, all variables shown in Table I, except r and w generally comprise both a magnitude and an angle in polar coordinates, which can be converted to complex coordinates. The relationship described in equation 5 above can be rewritten for the multi-input/multi-output case using the terms described in Table I. The result is four coupled simultaneous equations, incorporating the effects of perturbations in both front and back planes that could have occurred at rotational speeds slightly different from the current speed. These four relationships are shown below and identified as equation 6.

$$a_{back4} = -\left(\frac{a_{back1} - a_{back0}}{r \cdot \omega_{back}^2 \cdot \Delta m_{back\_cb}}\right) \cdot r \cdot \omega^2 \cdot m_{backplane\_cb} - \left(\frac{a_{back3} - a_{back2}}{r \cdot \omega_{front}^2 \cdot \Delta m_{front\_cb}}\right) \cdot r \cdot \omega^2 \cdot m_{frontplane\_cb}$$

$$a_{front4} = -\left(\frac{a_{front1} - a_{front0}}{r \cdot \omega_{back}^2 \cdot \Delta m_{back\_cb}}\right) \cdot r \cdot \omega^2 \cdot m_{backplane\_cb} - \left(\frac{a_{front3} - a_{front2}}{r \cdot \omega_{front}^2 \cdot \Delta m_{front\_cb}}\right) \cdot r \cdot \omega^2 \cdot m_{frontplane\_cb}$$

$$f_{back4} = -\left(\frac{f_{back1} - f_{back0}}{r \cdot \omega_{back}^2 \cdot \Delta m_{back\_cb}}\right) \cdot r \cdot \omega^2 \cdot m_{backplane\_cb} - \left(\frac{f_{back3} - f_{back2}}{r \cdot \omega_{front}^2 \cdot \Delta m_{front\_cb}}\right) \cdot r \cdot \omega^2 \cdot m_{frontplane\_cb}$$

$$f_{front4} = -\left(\frac{f_{front1} - f_{front0}}{r \cdot \omega_{back}^2 \cdot \Delta m_{back\_cb}}\right) \cdot r \cdot \omega^2 \cdot m_{backplane\_cb} - \left(\frac{f_{front3} - f_{front2}}{r \cdot \omega_{front}^2 \cdot \Delta m_{front\_cb}}\right) \cdot r \cdot \omega^2 \cdot m_{frontplane\_cb}$$

(6)

The four mathematical relationships illustrated in equation 6 above can be grouped together and treated as a matrix equation in the following discussion. The meanings of the subscripts in equation 6 above are identified in Table II.

TABLE II

| SUBSCRIPT | MEANING |
| --- | --- |
| 0 | Measurement prior to back plane counterbalance test mass $\Delta m_{back\_cb}$ |
| 1 | Measurement after back plane counterbalance test mass $\Delta m_{back\_cb}$ |
| 2 | Measurement prior to front plane counterbalance test mass $\Delta m_{front\_cb}$ |
| 3 | Measurement after front plane counterbalance test mass $\Delta m_{front\_cb}$ |
| 4 | Current sensor measurement |

The relationships shown above in equation 6 can be applied to equation 5 in matrix form as:

$$\begin{bmatrix} a_{back4} \\ a_{front4} \\ f_{back4} \\ f_{front4} \end{bmatrix} = -\begin{bmatrix} \frac{a_{back1} - a_{back0}}{r \cdot \omega_{back}^2 \Delta m_{back\_cb}} & \frac{a_{back3} - a_{back2}}{r \cdot \omega_{front}^2 \Delta m_{front\_cb}} \\ \frac{a_{front1} - a_{front0}}{r \cdot \omega_{back}^2 \Delta m_{back\_cb}} & \frac{a_{front3} - a_{front2}}{r \cdot \omega_{front}^2 \Delta m_{front\_cb}} \\ \frac{f_{back1} - f_{back0}}{r \cdot \omega_{back}^2 \Delta m_{back\_cb}} & \frac{f_{back3} - f_{back2}}{r \cdot \omega_{front}^2 \Delta m_{front\_cb}} \\ \frac{f_{front1} - f_{front0}}{r \cdot \omega_{back}^2 \Delta m_{back\_cb}} & \frac{f_{front3} - f_{front2}}{r \cdot \omega_{front}^2 \Delta m_{front\_cb}} \end{bmatrix} \cdot \begin{bmatrix} m_{backplane\_cb} \\ m_{frontplane\_cb} \end{bmatrix} \cdot r \cdot \omega^2$$

(7)

Where we describe this matrix equation as being in the form b=Ax and $$A = -\frac{\partial f(m)}{\partial m} = -\begin{bmatrix} \frac{a_{back1} - a_{back0}}{r \cdot \omega_{back}^2 \cdot \Delta m_{back\_cb}} & \frac{a_{back3} - a_{back2}}{r \cdot \omega_{front}^2 \cdot \Delta m_{front\_cb}} \\ \frac{a_{front1} - a_{front0}}{r \cdot \omega_{back}^2 \cdot \Delta m_{back\_cb}} & \frac{a_{front3} - a_{front2}}{r \cdot \omega_{front}^2 \cdot \Delta m_{front\_cb}} \\ \frac{f_{back1} - f_{back0}}{r \cdot \omega_{back}^2 \cdot \Delta m_{back\_cb}} & \frac{f_{back3} - f_{back2}}{r \cdot \omega_{front}^2 \cdot \Delta m_{front\_cb}} \\ \frac{f_{front1} - f_{front0}}{r \cdot \omega_{back}^2 \cdot \Delta m_{back\_cb}} & \frac{f_{front3} - f_{front2}}{r \cdot \omega_{front}^2 \cdot \Delta m_{front\_cb}} \end{bmatrix}$$

(8)

Equations 6, 7 and 8 depict the mathematical model generally described in U.S. Pat. No. 5,561,993. This mathematical model is formulated, such that the dynamics of the system are divided into two columns based on whether mass is placed in the front plane (i.e., column 2) or the back plane (i.e., column 1) of the spinner. The present invention disclosed herein may be used with this control model or like extensions, the more general solution of which allows for the placement of mass in both the front and the back plane simultaneously to formulate the control model and apply control actions. This more general control model solution is briefly discussed and used herein for describing the present invention.

In describing the more general control model solution, the model developed in equations 5, 6, and 7 takes on the general form shown in equation 9.

$$f(i+2) = -\left[\frac{f(i+1)-f(i)}{\|m(i+1)-m(i)\|} \quad \frac{f(i+2)-f(i+1)}{\|m(i+2)-m(i+1)\|}\right]\left[\frac{m(i+1)-m(i)}{\|m(i+1)-m(i)\|} \quad \frac{m(i+2)-m(i+1)}{\|m(i+2)-m(i+1)\|}\right]^{-1}\begin{bmatrix}\Delta M_{back\_cb}\\ \Delta M_{front\_cb}\end{bmatrix} \quad (9)$$

In equation 9 above, f(i) represents the $i^{th}$ sensor reading; f(i+2) is equivalent to $f(m_{aftertest})$ illustrated in equation 5. Also, m(i) may be a complex vector representing the force at the front and back planes of the rotating apparatus resulting from the $i^{th}$ test action. The equation $\Delta m(I+1)=m(I+1)-m(i)$ may represent a complex vector of counterbalance force applied to the spinner; each test action is formed by injecting simultaneously in the front and the back plane of the spinner. The A matrix (df(m)/dm) obtained from equation 5 is now represented by the relation shown in equation 10.

$$A = -\frac{\partial f}{\partial m(i)} \quad (10)$$
$$= -\left[\frac{f(i+1)-f(i)}{\|m(i+1)-m(i)\|} \quad \frac{f(i+2)-f(i+1)}{\|m(i+2)-m(i+1)\|}\right]$$
$$\left[\frac{m(i+1)-m(i)}{\|m(i+1)-m(i)\|} \quad \frac{m(i+2)-m(i+1)}{\|m(i+2)-m(i+1)\|}\right]^{-1}$$

Equation 11 below shows the A matrix for the more general control model solution, where 2 control actuators, or control planes, and 4 sensor readings are available as in the case described in equations 6 through 8.

$$A = -\begin{bmatrix}\frac{a_{back1}-a_{back0}}{\|\Delta m(1)_{cb}\|} & \frac{a_{back2}-a_{back1}}{\|\Delta m(2)_{cb}\|}\\ \frac{a_{front1}-a_{front0}}{\|\Delta m(1)_{cb}\|} & \frac{a_{front2}-a_{front1}}{\|\Delta m(2)_{cb}\|}\\ \frac{f_{back1}-f_{back0}}{\|\Delta m(1)_{cb}\|} & \frac{f_{back2}-f_{back1}}{\|\Delta m(2)_{cb}\|}\\ \frac{f_{front1}-f_{front0}}{\|\Delta m(1)_{cb}\|} & \frac{f_{front2}-f_{front1}}{\|\Delta m(2)_{cb}\|}\end{bmatrix} \quad (11)$$
$$\begin{bmatrix}\frac{\Delta m(1)_{back\_cb}}{\|\Delta m(1)_{cb}\|} & \frac{\Delta m(1)_{back\_cb}}{\|\Delta m(2)_{cb}\|}\\ \frac{\Delta m(1)_{front\_cb}}{\|\Delta m(1)_{cb}\|} & \frac{\Delta m(1)_{front\_cb}}{\|\Delta m(2)_{cb}\|}\end{bmatrix}^{-1}$$

The equation relationships shown in equation 9 can be rearranged to solve for the counterbalance forces, $\Delta m_{back\_cb}$ and $\Delta m_{front\_cb}$, required to bring the system into balance. Utilizing the A matrix from equation 11 for the case of four sensors, a relationship can be expressed through equation 12 as follows:

$$\begin{bmatrix}\Delta m_{back\_cb}\\ \Delta m_{front\_cb}\end{bmatrix} = A^+ \cdot \begin{bmatrix}a_{back}\\ a_{front}\\ f_{back}\\ f_{front}\end{bmatrix} \quad (12)$$

In a situation such as that described by equation 12 above, sensor values (i.e., two accelerations and two forces) are known from measurements and two counterbalance forces are unknown. This results in a situation where there are more equations than unknowns as each sensor provides an equation and there are only two unknown counterbalance forces for the front and back planes of the drum. This condition describes an over-determined system. An over-determined system may have more than one possible solution and a technique is generally required to solve for more equations than unknowns in an optimal manner.

A technique for solving equations of this type in a balancing scheme should find a solution that minimizes all of the sensor readings and also minimizes the amount of counterbalance media required to balance the rotating system or rotating device. In other words, the force sensors and the accelerometers should all be driven as close to zero as possible by the selected counterbalances and the total amount of counterbalance media (i.e., fluid or mass) applied should be minimized.

Those skilled in the art can appreciate that a mathematical technique which may solve this problem involves computation of the pseudo-inverse of the A matrix ($A^+$) utilizing the singular value decomposition (SVD) technique. This solution method finds the optimal solution to the over-determined system shown in equation 9. The SVD is one of several techniques that can support the pseudo-inverse calculation for control. It can provide optimal control for both inputs and outputs of the modeled system. Other variations of the components that make up the SVD may be used alone but would not provide both input and output optimization. This procedure is fully described in U.S. Pat. No. 5,561,993 and is well known to those skilled in the art. It is also described in significant detail in various reference linear algebra textbooks.

After generating the solution to equation 12, it may be necessary to formulate a practical approach to applying the counterbalance mass to the rotating member. Further, after the control action is applied, it may be necessary to evaluate the member to verify that the control action had the desired balancing affect. An approach to applying counterbalance and verifying the control action effect is fully described in U.S. Pat. No. 5,561,993, which is incorporated herein by reference. Those skilled in the art can appreciate that the approaches to applying counterbalance and verifying the control action effect, which were disclosed in U.S. Pat. No. 5,561,993, do not limit the scope of the present invention. The features, techniques, methods and systems disclosed in U.S. Pat. No. 5,561,993 are described herein for illustrative and background purposes only.

In an ideal system, the force applied to the rotating portion of the member is linearly related to the force and motion that the sensors measure. In this ideal system the placement of the optimal counterbalances determined by the solving the system in the manner described herein should drive all of the sensors to zero and achieve perfect balance of the rotating member. For various reasons, however it is not expected that an ideal system exists and certain system balance, operational safety, and physical constraints need to be considered.

In applying counterbalance and verifying the control action in a preferred embodiment of the present invention, "system-balance", operational safety, and physical constraints can be evaluated based on the concept of sensor measurement thresholds and other metrics. In regard to the thresholds, the extremes are the balance threshold and the maximum threshold. The balance threshold defines the sensor level below which the rotating member is defined as being in a balanced state. The maximum threshold defines the sensor level above which the rotating member should not be for any extended length of time. Intermediate thresholds establish levels at which balance control versus speed control decisions get made. The system-balance and operational safety constraints may direct the top-level control sequence.

Physical limits and safety evaluation impact control actions operating points between the balance and the maximum threshold levels. The control actuator applies a physical limit on the amount of input that can be applied to the system at any one time (smallest and largest), as does the physical design of the rotating member in terms of accommodating the counterbalance mass. These physical limits are evaluated in terms of their ability to affect sensor responses by an amount less than the balance threshold with sufficient room to operate (i.e., allow multiple control actions) within the balance to maximum threshold range. Given sufficient room to operate, the size and correctness of a recommended counterbalance action may be a safety concern. A large recommended counterbalance action or an incorrectly placed counterbalance may increase rather than decrease the degree of out-of-balance; as such, it may not be prudent to apply the entire counterbalance to the member in one control action. Thus, a set of limits may be used to safely apply the recommended counterbalance action to the rotatable member. Conversely, system-balance constraints come into play when control actions, counterbalance or test, are used to create or update the control model as described above. These actions should be large enough to provide a good approximation of slope, as illustrated in FIGS. 1 and 2.

One important example of an instance where safety concerns may be important and the counterbalance computations may not be valid is at any point along the mechanical resonance peak of any portion of the rotating member or member housing. Depending on the nature of the resonance, the response of the sensors to a fixed magnitude counterbalance action at or near the natural frequency may be several times larger than the sensor response to the same fixed magnitude counterbalance action at a rotational speed far from the natural frequency. For this reason it may be desirable to apply smaller test actions in regions surrounding the resonant frequencies of the rotatable apparatus. This means the test and counterbalance action magnitudes may be limited throughout the full range of operating speeds, based on the maximum system response defined by the natural frequency characteristics of the rotatable apparatus. In some systems one can simply characterize the frequency response of the system and then utilize such a characterization to identify the speeds that correspond to resonance and the surrounding regions. Based on this characterization, one can then adjust the test masses accordingly in these regions. However, in some situations such as those described in U.S. Pat. No. 5,561,993, the system in question may be dynamic. In a washing appliance, such as a washing machine, for example, the location and characteristics of the out-of-balance changes with each load of clothes. The frequency response of the machine is thus highly related to the mass of the spinner out-of-balance load (i.e., eccentric mass); and, as a result, the rotational speed associated with the resonance also changes with each load. For these reasons it may be desirable to dynamically identify the resonance associated with self-balancing rotatable devices, such as, for example, washing appliances or centrifuge systems.

The present invention thus discloses a method and system that utilizes existing control models to dynamically identify when a rotatable device is entering a region of resonance. Such an existing control model can be formed based on the Newton Raphson technique described in equation 1. The objective of such as control model is to find an input to the system that makes the next set of sensor measurements all equal to zero ($f(m_{next})=0$) or to balance the system. In order to solve the control problem we set the $f(m_{next})$ term in equation 1 equal to zero and solve the equation for the control action required. If instead we were interested in finding out what the next set of sensor measurements would be given certain input conditions, one could use the equation in the form provided in equation 1. One may recall that in this equation the f(m) terms represent the sensor measurements in the system and m represents the out-of-balance in the system.

When rotatable objects are not in perfect balance, non-symmetrical mass distribution creates out-of-balance forces because of the centrifugal forces that result from rotation of the object. The "out-of-balance" (m) present in the system can be represented by one or more eccentric loads on the rotating member. These loads apply forces and moments to the machine that can be represented by an out-of-balance force vector m. This vector is of the form shown in equation 13.

$$\vec{m} = mass R \omega^2 \quad (13)$$

In equation 13 "mass" represents the "out-of-balance" mass, R represents the radius of the rotating body and $\omega$ represents the speed of rotation. Rewriting equation 1 with the relationship expressed in equation 13 yields, equation 14.

$$f(m_{next}) \approx f(m_{aftertest}) + \left(\frac{\partial f(m)}{\partial m}\right) \cdot [(mass \cdot R \cdot \omega^2)_{next} - (mass \cdot R \cdot \omega^2)_{aftertest}] \quad (14)$$

Equation 14 can be used to predict new sensor readings based on a change in any of the terms on the left side of the equation. In order to predict the sensor readings that should occur with an increase in the machine speed one can use the A matrix model ($\epsilon f(m)/\epsilon m$) obtained using the last two appropriate control actions as well as the current sensor readings to substitute into equation 14. If the system is changing speed and all other aspects of the system remain relatively constant (i.e., no additional control actions) or are characterized (such as water extraction), then the mass of the eccentricity (mass) remains constant. The radius of the spinning apparatus (R) does not change and, therefore, the equation reduces to the form of equation 15.

$$f(m_{next}) \approx f(m_{aftertest}) + \left(\frac{\partial f(m)}{\partial m}\right) \cdot mass \cdot R[\omega^2_{next} - \omega^2_{aftertest}] \quad (15)$$

In the preferred embodiment of the present invention the speed increase increment is predetermined so that $\omega_{next}$ and $\omega_{aftertest}$ are both known.

The only remaining unknown on the left side of equation 15 is the mass of the eccentric load. This can be estimated using the control model. In the control model we assume we are solving the system such that the next sensor measurement will be equal to zero. The only way this can happen is if the eccentric load or mass at that time also equals zero. Therefore, the eccentric load or mass that is presently in the system is estimated as the mass associated with the predicted system unbalance. The predicted system unbalance would be vector negative of the new counterbalance action or control action obtained using the control model and equation 12. Using this information equation 13 can be solved for mass*R using the negative of the control action and the results can be substituted into equation 15 to solve for the predicted sensor readings.

Once there are predicted sensor responses for the system, one can increase or decrease the speed of rotation and then compare the predicted sensor responses to the actual responses that the system sees. If the actual sensor measurement responses are larger than the predicted readings by a predetermined amount, this may be a leading indicator that the system is approaching a resonant peak.

In an ideal system these predicted sensor readings would always match the actual sensor readings in regions of operation that are far away from resonance. However, because the system is nonlinear and the system model is only a linear approximation of the system surrounding the current operating point, the system does not always follow the ideal behavior. Therefore, the resulting sensor predictions may not directly be compared to the actual sensor readings. Instead an empirical safety factor may be used for the comparison in order to eliminate false positive resonance detection. Changes in response due to known or characterizable phenomenon (such as water extraction) can also be built into the calculation of the empirical safety factor.

Once a region of resonance has been identified, the size of at least one test action may be adjusted to mitigate the amplification of sensor measurement responses of the rotating system in regions surrounding the resonant frequencies of the rotating system. The increase and decrease speed increments may also be altered in response to identification of a resonant condition. The control model may then be constructed using the modified test actions and used to determine the control actions that are required to drive the sensor measurement response of the rotating system to a balanced condition.

With the general approach for identifying system resonance described, it may be instructive to consider the supervisory system in which it has been implemented in the preferred embodiment of the present invention. Consider the washing machine application described herein, a particular implementation of the present invention may start the spin cycle at the speed where the centripetal force due to rotation is greater than the force due to gravity. At this speed the clothes may be plastered to the wall of the machine; thus it is referred to as plaster speed. At plaster speed the values of the force and motion sensors are evaluated against the threshold constraints previously discussed herein. If all of the sensors are below the minimum or balance threshold, the machine is considered to be in a balanced state.

Figure 8:
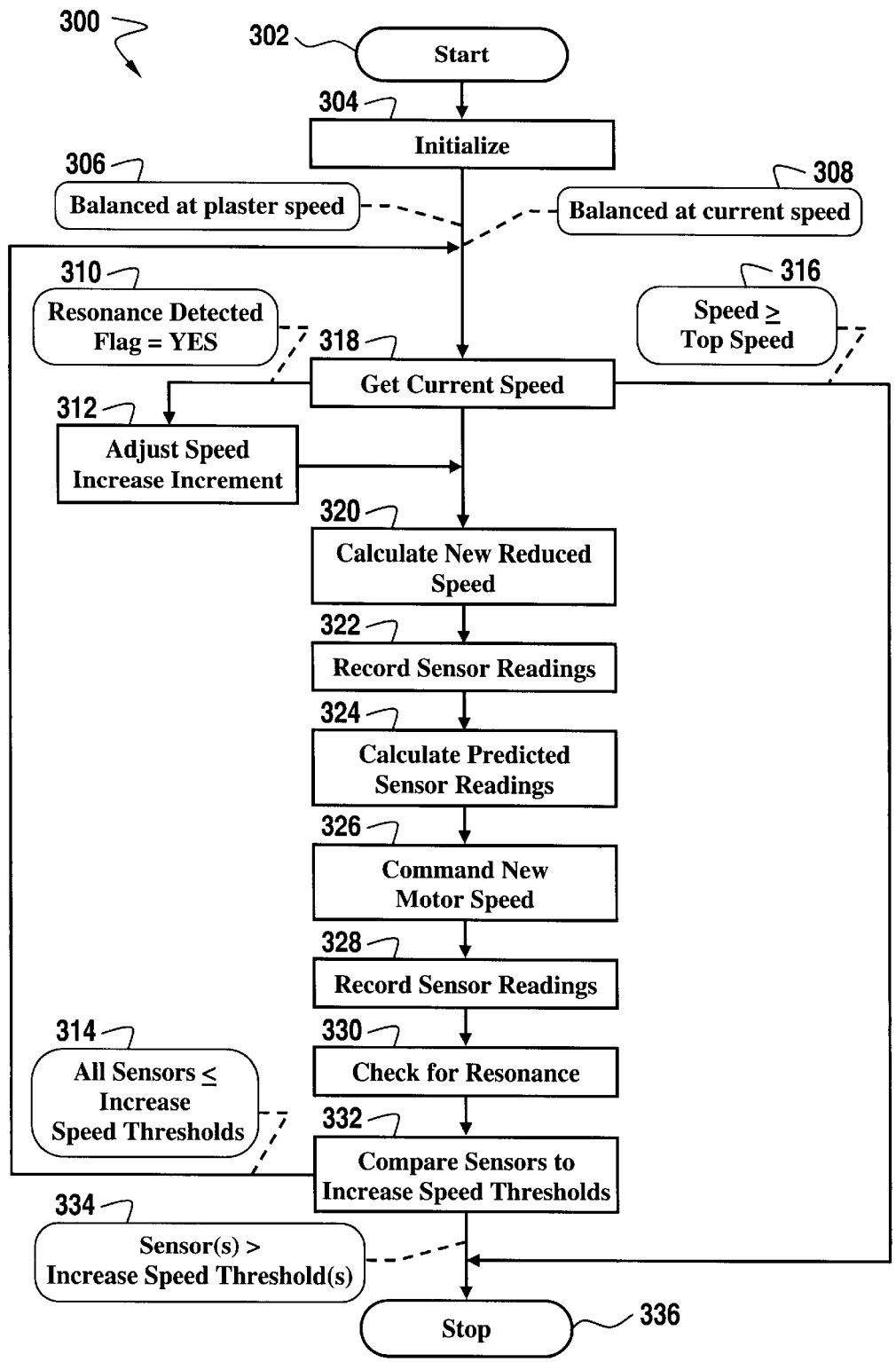
FIG. 8 depicts a flow chart of operations illustrating operational steps for controlling changes in rotational speed for a self-balancing rotatable apparatus, in accordance with preferred embodiments of the present invention.

When the rotating apparatus has reached a balanced state at a particular speed of operation and this speed is less than the top speed of rotation, one can increase the speed of rotation. FIG. 8 depicts a flow chart 300 illustrating operational steps for adjusting speed in conjunction with the balance control of a rotatable apparatus. In an ideal system the speed of rotation could be increased by a large amount and the system would remain in a balanced state; however, in applications such as the washing machine, the out-of-balance load changes with an increase or decrease in rotational speed. Thus the speed may be increased in small increments that satisfy the safety constraints discussed earlier.

The speed control routine described by FIG. 8 begins, as indicated at block 302, and is initialized as illustrated at block 304. In accordance with a particular embodiment of the present invention, the speed control routine can be generally entered under one of the conditions described by transition points 306 or 308. Transition point 306 indicates "balanced at plaster speed," while transition point 308 indicates "balanced at current speed". The current speed can be obtained, as depicted at block 318, and compared to the top speed that the rotating system or rotating apparatus is configured to attain. If the top speed has been reached or exceeded as illustrated by transition block 316, then the supervisor exits the speed routine and the balance control action can be terminated, as indicated thereafter at block 336.

The first time the speed control loop is entered under an "increase speed condition," the "resonance detected flag" will be set equal to NO and the routine will continue to be processed, as indicated at block 320. As depicted at block 320, a new speed is calculated based on an increased speed increment that had been obtained for the rotating system or rotating apparatus requiring balancing. Those skilled in the art can appreciate that the increase speed increment can be calculated in a variety of manners, such as considering the change in out-of-balance force for a particular speed increment, utilizing safety constraints, or through empirical techniques. The particular technique that is utilized to calculate the speed increase increment in no way limits the scope of the present invention.

After the new speed has been calculated, the current sensor readings are recorded as illustrated at block 322. Utilizing the control model, the predicted sensor readings for the new speed can be calculated, as depicted at block 324. After the predicted sensor readings have been calculated, the new motor speed is commanded, as illustrated at block 326, and the low-level motor control routine increases the speed of rotation to the new speed.

Once the new speed is obtained, the actual sensor readings at that particular speed can be recorded, as described at block 328. These actual sensor readings are then compared to the predicted sensor readings and a determination is made as to whether the machine is within a resonance band. This so-called "check for resonance" is indicated at block 330. During this check, the resonance flag may also be set for later use.

After the resonance check has been carried out, the sensor readings may be compared to their increase speed thresholds, as shown in block 332. The increase speed thresholds are one of the intermediate thresholds mentioned herein and can be utilized to determine the point at which the rotating system or rotating apparatus should stop increasing speed and take action to balance itself. If the result of the evaluation indicates all of the sensors are below their respective increase speed threshold, the loop is repeated as indicated by transition block 314.

During the second time through the loop, the "resonance detected flag" may be set. After obtaining the current rotation speed, the flag may be equal to YES, as indicated at transition block 310. In this case, the speed increment can be adjusted accordingly, as shown in block 312, and the procedure may be repeated until either the top speed has been reached, as indicated at transition point 316, or one or more sensors has surpassed its increase speed threshold, as indicated at transition point 334. In the case where the increase speed threshold has been exceeded, control returns to the balance loop to apply mass to the spinner accordingly.

The operational steps depicted in FIG. 8 may be implemented as program code, a software module or series of related software modules. Such modules may be integrated with hardware to perform particular operational functions. A "module" as known by those skilled in the computer programming arts is generally a collection of routines, subroutines, and/or data structures, which perform a particular task or implement certain abstract data types. Modules generally are composed of two sections. The first section is an interface, which compiles the constants, data types, variables, and routines. The second section is generally configured as a private feature that is accessible only by the module, and which includes the source code that activates the routines in the module or modules thereof. A software implementation of the present invention may thus involve the use of such modules, and or implementation of a program product based on the operational steps illustrated in FIG. 8. Such a program product may additionally be configured as signal-bearing media, including recordable and/or transmission media.

Based on the foregoing, those skilled in the art can appreciate that the invention described herein thus teaches techniques for identifying resonance dynamically within a rotating system or rotating apparatus. The size of test actions may then be adjusted to mitigate amplification of the response of the rotating system or rotating apparatus (i.e., self-balancing rotatable apparatus) to test actions. The change of speed that is performed before the machine (i.e., rotating system or rotating apparatus) checks sensor readings, also reduces when a resonance is suspected. Note that as utilized herein the term "rotatable apparatus," "rotatable system," "rotating system," or "rotating device" may be utilized interchangeably to describe generally a machine, such as a washing appliance or centrifuge system requiring balancing. The invention described herein is thus applicable to any centrifuge operation where a balanced condition is required. Those skilled in the art can thus appreciate that the invention described herein is not limited to uses in which the action of fluid is utilized to achieve a balanced condition, but can be implemented in any embodiment in which any type of balancing substance is placed in a known location on a rotating system or rotating apparatus with one or more possible input planes.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. A method for identifying resonance in a rotating system, wherein said rotating system includes sensors and sensor measurements thereof whose responses to control actions are utilized to represent said rotating system through a control model, said method comprising the steps of:

utilizing said control model and at least one current sensor reading to calculate at least one predicted sensor reading due to a change in a rotational speed of said rotating system;

obtaining at least one new sensor reading after said change in said rotational speed of said rotating system is carried out; and comparing said at least one new sensor reading to said at least one predicted sensor reading to determine if said rotating system is entering resonance, based on a difference between said at least one current sensor reading and said at least one predicted sensor reading.

2. The method of claim 1 further comprising the step of: obtaining said at least one current sensor reading from at least one sensor associated with said rotating system.

3. The method of claim 1 further comprising the step of: configuring said control model, such that a system out-of-balance can be estimated for utilization in calculating at least one predicted sensor reading.

4. The method of claim 1 further comprising the steps of:

incorporating a resonance identification into a balance control procedure to thereby improve balance times and facilitate achievement of maximum spin speeds within said rotating system; and dynamically identifying a resonance of said rotating system, in response to comparing said at least one current sensor reading to said at least one predicted sensor reading to determine if said rotating system is entering resonance, based on a difference between said at least one current sensor reading and said at least one predicted sensor reading without interrupting a balance control strategy associated with said rotating system.

5. The method of claim 4 further comprising the step of: adjusting a speed change to mitigate an amplification of at least one sensor measurement response to changes in rotational speed, in response to dynamically identifying said resonance of said rotating system.

6. The method of claim 4 further comprising the step of: adjusting at least one action to mitigate amplification of at least one sensor measurement response to at least one subsequent action, in response to dynamically identifying said resonance of said rotating system.

7. The method of claim 1 wherein said rotating system comprises at least one input plane.

8. The method of claim 1 wherein said rotating system comprises a centrifuge system.

9. The method of claim 1 wherein said rotating system comprises a washing appliance.

10. The method of claim 9 wherein said washing appliance comprises a washing machine.

11. A method for identifying resonance in a rotating system, wherein said rotating system includes sensors and sensor measurements thereof whose responses to control actions are utilized to represent said rotating system through a control model, said method comprising the steps of:

obtaining at least one current sensor reading from at least one sensor associated with said rotating system;

utilizing said control model and said at least one current sensor reading to calculate at least one predicted sensor reading due to a change in a rotational speed of said rotating system;

obtaining at least one new sensor reading after said change in said rotational speed of said rotating system is carried out;

comparing said at least one new sensor reading to said at least one predicted sensor reading to determine if said rotating system is entering resonance, based on a difference between said at least one current sensor reading and said at least one predicted sensor reading.

12. A method for identifying resonance in a rotating system, wherein said rotating system includes sensors and sensor measurements thereof whose responses to control actions are utilized to represent said rotating system through a control model, said method comprising the steps of:

obtaining at least one current sensor reading from at least one sensor associated with said rotating system;

utilizing said control model and said at least one current sensor reading to calculate at least one predicted sensor reading due to a change in a rotational speed of said rotating system;

obtaining at least one new sensor reading after said change in said rotational speed of said rotating system is carried out;

configuring said control model, such that a system out-of-balance can be estimated for utilizing in calculating at least one predicted sensor reading; and comparing said at least one new sensor reading to said at least one predicted sensor reading to determine if said rotating system is entering resonance, based on a difference between said at least one current sensor reading and said at least one predicted sensor readings.

13. A method for identifying resonance in a rotating system, wherein said rotating system includes sensors and sensor measurements thereof whose responses to control actions are utilized to represent said rotating system through a control model, said method comprising the steps of:

obtaining at least one current sensor reading from at least one sensor associated with said rotating system;

utilizing said control model and said at least one current sensor reading to calculate at least one predicted sensor reading due to a change in a rotational speed of said rotating system;

obtaining at least one new sensor reading after said change in said rotational speed of said rotating system is carried out;

comparing said at least one new sensor reading to said at least one predicted sensor reading to determine if said rotating system is entering resonance, based on a difference between said at least one current sensor reading and said.at least one predicted sensor reading; and incorporating a resonance identification into a balance control procedure to thereby improve balance times and facilitate achievement of maximum spin speeds within said rotating system.

14. The system of claim 13 wherein said at least one current sensor reading is obtained from at least one sensor associated with said rotating device.

15. The system of claim 13 wherein said control model is configured such that a system out-of-balance can be estimated for use in calculating said at least one predicted sensor reading.

16. The system of claim 15 wherein a speed change associated with said rotating device is adjusted to mitigate amplification of at least one sensor measurement response to changes in rotational speed, in response to dynamically identifying said resonance of said rotating device.

17. The system of claim 15 wherein said at least one action is adjusted to mitigate amplification of at least one sensor measurement response to at least one subsequent action, in response to dynamically identifying said resonance of said rotating device.

18. The system of claim 15 wherein said rotating device comprises at least one input plane.

19. The system of claim 13 further comprising:

a resonance identification incorporated into a balance control procedure associated with said rotating device to thereby improve balance times and facilitate achievement of maximum spin speeds within said rotating device; and a resonance of said rotating device, wherein said resonance is dynamically identified in response to comparing said at least one current sensor reading to said at least one predicted sensor reading to determine if said rotating device is entering resonance, based on a difference between said at least one current sensor reading and said at least one predicted sensor reading without interrupting said balance control procedure associated with said rotating device.

20. The system of claim 13 wherein said rotating device comprises a centrifuge system.

21. The system of claim 20 wherein said washing appliance comprises a washing machine.

22. The system of claim 13 wherein said rotating device comprises a washing appliance.

23. A system for identifying resonance in a rotating device, wherein said rotating device includes sensors and sensor measurements thereof whose responses to control actions are utilized to represent said rotating device through a control model, said system comprising:

said control model and at least one current sensor reading utilized to calculate at least one predicted sensor reading due to a change in a rotational speed of said rotating device;

at least one new sensor reading obtained after said change in said rotational speed of said rotating device is carried out; and said at least one new sensor reading compared to said at least one predicted sensor reading to determine if said rotating device is entering resonance, based on a difference between said at least one current sensor reading and said at least one predicted sensor reading.

24. A system for identifying resonance in a rotating device, wherein said rotating device includes sensors and sensor measurements thereof whose responses to control actions are utilized to represent said rotating device through a control model, said system comprising:

at least one current sensor reading obtained from at least one sensor associated with said rotating device;

said control model and said at least one current sensor reading utilized to calculate at least one predicted sensor reading due to a change in a rotational speed of said rotating device;

at least one new sensor reading obtained after said change in said rotational speed of said rotating device is carried out;

control model configured such that a system out-of-balance can be estimated for utilization in calculating said at least one predicted sensor reading; and said new sensor reading compared to said at least one predicted sensor reading to determine if said rotating device is entering resonance, based on a difference between said at least one current sensor reading and said at least one predicted sensor reading.

* * * * *